United States Patent Office 3,183,772
Patented May 18, 1965

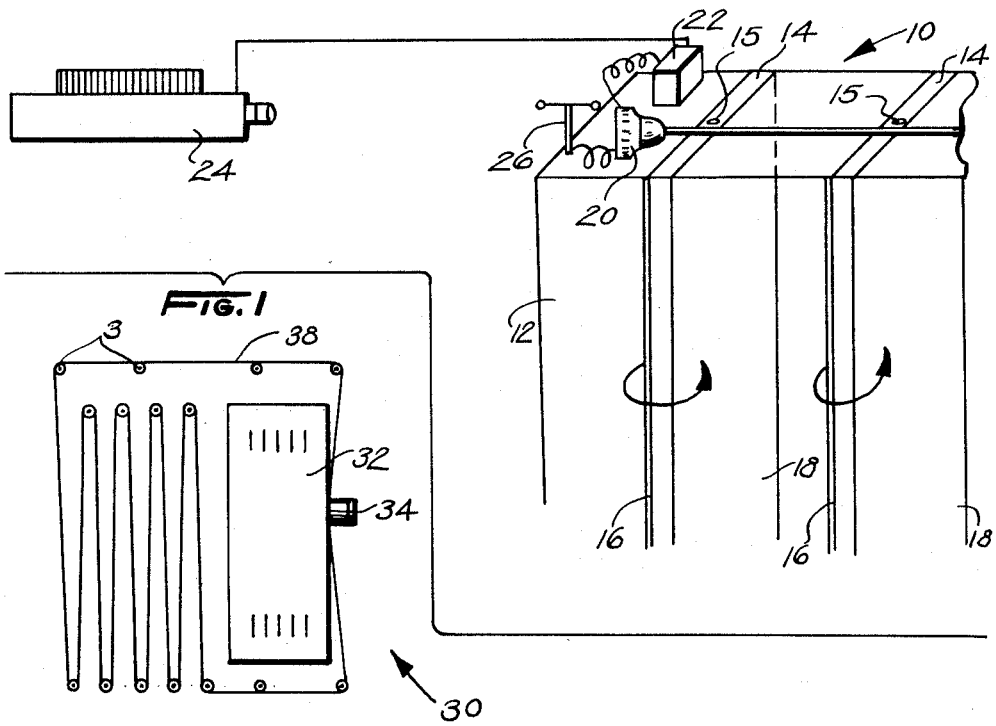
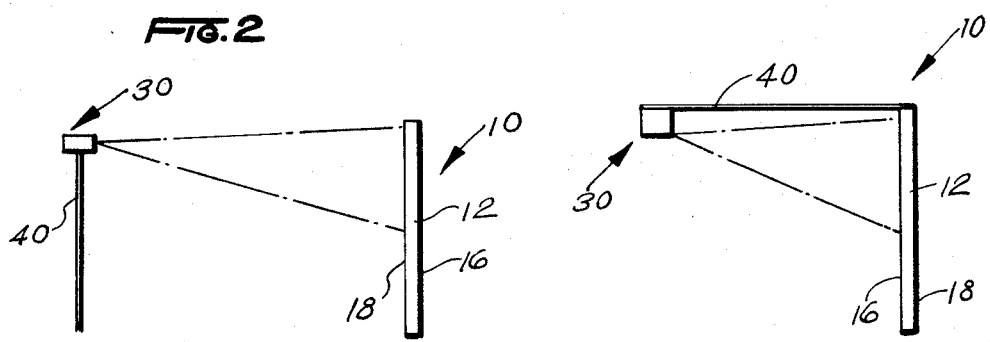
FIG.1
FIG.2
FIG.3
FIG.4
INVENTOR.
BILL F. FITZPATRICK

3,183,772
ACTION ADVERTISING THRU PROJECTION
Bill F. Fitzpatrick, 914 Rock Creek Ave., Pensacola, Fla.
Filed Mar. 14, 1963, Ser. No. 265,091
1 Claim. (Cl. 88—24)

This invention relates to advertising devices and, more particularly, to an advertising display for both day time and night time use.

It is an object of the present invention to provide an adjustable advertising display having one side supporting a poster display for day time use and an opposite side supporting a reflective surface for projecting an image for night time use.

Another object of the present invention is to provide an action advertising display of the type described in which the opposite sides of the display are automatically reversible so as to bring the reflective surface thereof into visual accessibility during night time hours, and to rotate the display poster side thereof into visual observation during day time hours.

Aside from the foregoing specific objects, another important object of this invention is to provide an improved display apparatus which will achieve the foregoing results in a new and novel manner so as to represent a general advance in this field.

With the above and numerous other objects in view as will appear as the description proceeds, the invention consists in certain novel features of construction, and in the combination and arrangement of parts as will be hereinafter more fully described and claimed.

In the drawings:

FIGURE 1 is a fragmentary perspective view of display apparatus made in accordance with the present invention in use with a slide projector;

FIGURE 2 is a side elevational view of a continuous film strip projector adapted for use with the present invention;

FIGURE 3 is a side elevational view of the projector shown in FIGURE 2 in actual use with a display panel made in accordance with the present invention, with the projector being supported remotely from the panel; and FIGURE 4 is a view similar to FIGURE 3, showing the projector supported from the panel itself.

Referring now to the drawing, and more particularly to FIGURE 1 thereof, an advertising display unit 10 made in accordance with the present invention is shown to include a display board having an rectangular frame 12 within which a plurality of flat rectangular strips 14 are pivotally supported by means of pivot pins 15 for rotation about spaced apart longitudinal axes. One side of each such strip 14 is provided with a segment of a display poster 16, whereas the opposite side 18 thereof is provided with a reflective surface.

A motor gear drive unit 20 is connected to linkage for rotating the strips 14 between a day time position in which the display poster portion 16 thereof face the front of the unit, and a night time display unit in which the reflective surface portion 18 thereof faces forwardly of the frame 12. This dry unit 20 is automatically controlled by means of a photo-electric cell unit 22 connected in circuit therewith, and in circuit with a projector unit for projecting an image upon the reflective surface 18.

The projector may be either a slide projector 24, as shown in FIGURE 1, or may be a continuous strip motion picture projector 30.

A wind responsive gauge 26 is mounted upon the frame 12, and is responsive to a wind of predetermined magnitude to effective rotation of the strip 14 to the intermediate position shown in FIGURE 1 in the event that a heavy wind ensues, in which position, the unit is not subject to wind damage.

As is more clearly shown in FIGURE 2 of the drawing, the continuous strip film projector 30 includes a lamp housing 32 and lens system 34, past which a continuous strip of film 38 is guided around a series of guide rollers 36, for continuous projection upon the reflective surface 18.

The projector 30, or the slide projector 24, may be supported upon a support element 40 remotely from the frame 12, or may be supported directly from the frame 12 in the manner shown in FIGURE 4.

In actual use, in the absence of a wind of predetermined magnitude, the photo-electric cell 22 will control both the position of the strips 14 and the energization of the projector. During day time hours, the poster side 16 of the strips are rotated toward a position for visual observation. In the absence of such daylight, the photoelectric cell 22 is responsive thereto to energize the drive 20 to rotate the strips 14 so that the reflective sides 18 are exposed toward the projector, so that upon simultaneous energization of the projector, the projected image will be received and reflected by the display apparatus.

It will now be recognized that the slide projector 24 or film strip projector 30 can be utilized to provide an animated or still projected image for advertising one or more products or sponsors in a highly attractive and effective manner.

It will now be apparent that changes in the details of construction, and in the combination and arrangement of parts may be resorted to without departing from the spirit or scope of the invention as hereinafter claimed or sacrificing any of its advantages.

Having thus described this invention, what is claimed as new is:

An advertising display comprising in combination a display board having one side for daytime display of a posted and an opposite side for nighttime reflection of a projected image, a projector supported in spaced relation with said display board for projecting an image upon said opposite side thereof, automatic means for controlling the position of both sides of said display board for display purposes, said display board comprising a frame having a front side and a rear side, a plurality of flat strips pivotally supported upon said frame for rotation about a central longitudinal axis, one side of each of said strips having a portion of a display poster mounted thereon, and the opposite side of each of said strips having a reflector surface, said automatic means affecting rotation of said strips to expose the same one of said sides of all of said strips to said first side of said frame, said automatic means comprising a motor operated gear drive for simultaneously rotating all of said flat strips in a common direction a equal distance, an photo-electric cell connected in circuit with said motor operated gear drive for energizing said drive to rotate said reflector surface side of said strips toward said front of said frame in response to the absence of daylight, and to rotate said poster side of said strips toward said front of said frame in response to the presence of daylight, and wind sensing means for energizing said gear drive to rotate said strips to an intermediate right angle position in which all of said strips substantially lie in a plane extending normal to the plane of said frame in response to the presence of a predetermined wind force exerted upon said strips.

References Cited by the Examiner

UNITED STATES PATENTS

| | | | |
|---|---|---|---|
| 1,252,248 | 1/18 | Davis et al. | 88—24 |
| 1,823,404 | 9/31 | Marx et al. | |
| 2,680,316 | 6/54 | Webster et al. | 40—53 |
| 2,796,802 | 6/57 | De Felice | 88—28.9 X |
| 2,986,689 | 5/61 | Hofer. | |

FOREIGN PATENTS 269,846  7/50  Switzerland.

NORTON ANSHER, *Primary Examiner.*

WILLIAM MISIEK, *Examiner.*